United States Patent
Pan et al.

[11] Patent Number: 6,053,485
[45] Date of Patent: Apr. 25, 2000

[54] APPARATUS FOR TRAY VALVE ATTACHMENT

[75] Inventors: Guo-Chang Pan, Beijing, China; Karl T. Chuang, Edmonton, Canada

[73] Assignee: AMT International, Inc., Richardson, Tex.

[21] Appl. No.: 09/169,493

[22] Filed: Oct. 9, 1998

Related U.S. Application Data

[60] Provisional application No. 60/061,573, Oct. 10, 1997, abandoned.

[51] Int. Cl.[7] ............................................. B01F 3/04
[52] U.S. Cl. ........................................... 261/114.4
[58] Field of Search .................................... 261/114.4

[56] References Cited

U.S. PATENT DOCUMENTS

| | | | |
|---|---|---|---|
| 3,173,972 | 3/1965 | Van't Sant | 261/114.4 |
| 3,210,056 | 10/1965 | Van't Sant | 261/114.4 |
| 3,215,414 | 11/1965 | Van't Sant | 261/114.4 |
| 3,333,836 | 8/1967 | Bahout | 261/114.4 |
| 3,815,880 | 6/1974 | Price . | |
| 4,344,900 | 8/1982 | Sonnedecker et al. . | |

FOREIGN PATENT DOCUMENTS 1292037  10/1972  United Kingdom ................ 261/114.4

*Primary Examiner*—C. Scott Bushey
*Attorney, Agent, or Firm*—Baker Botts L.L.P.

[57] ABSTRACT

An apparatus and method for attaching a dispersion valve to a fractionation tray surface. The valve is inserted into a fractionation tray perforation. At least two legs extend downward from a cover plate with a larger area than the perforation. Each of the legs is positioned at or near the peripheral inner surface of the tray perforation. Each leg has an outwardly projecting hooking element. As the valve is inserted into the fractionation tray perforation by pressure applied to the cover plate, the hooking elements bend inward slightly to a smaller circumferential plane than that of the tray perforation. After insertion, the flexible legs spring back to their original outwardly projection. The tip of each hooking element then contacts the bottom surface of the fractionation tray to define and limit the upward motion of the valve. At least one downward projection from the cover plate defines and limits the downward motion of the valve into the tray perforation.

20 Claims, 1 Drawing Sheet

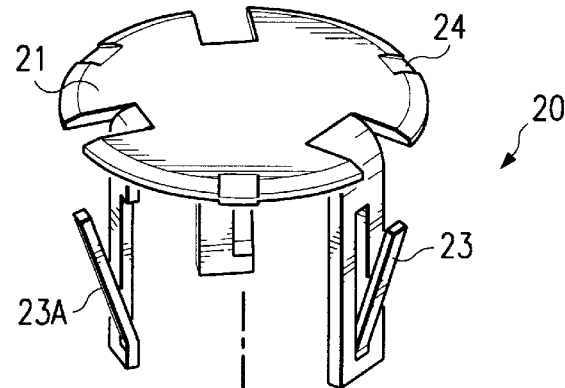
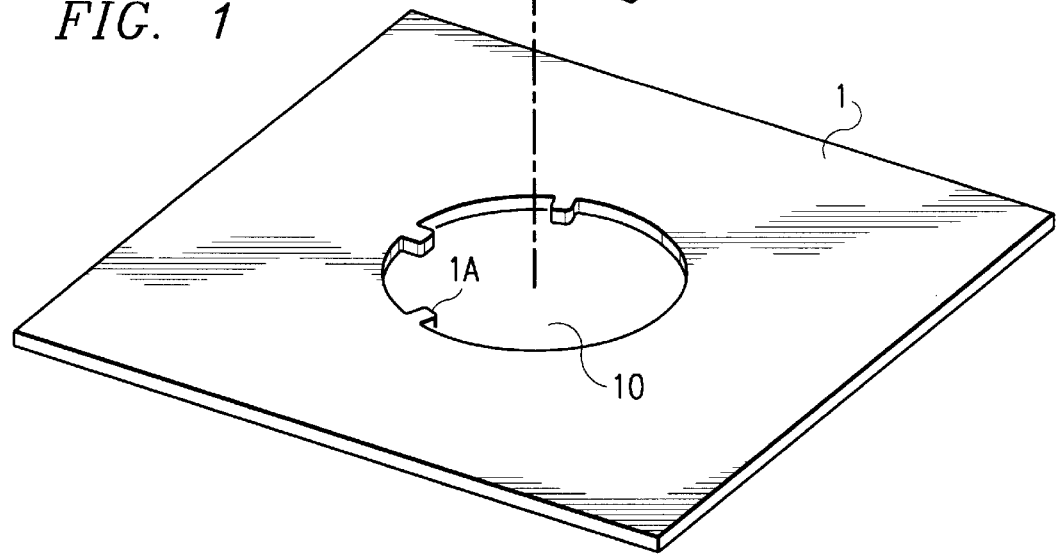
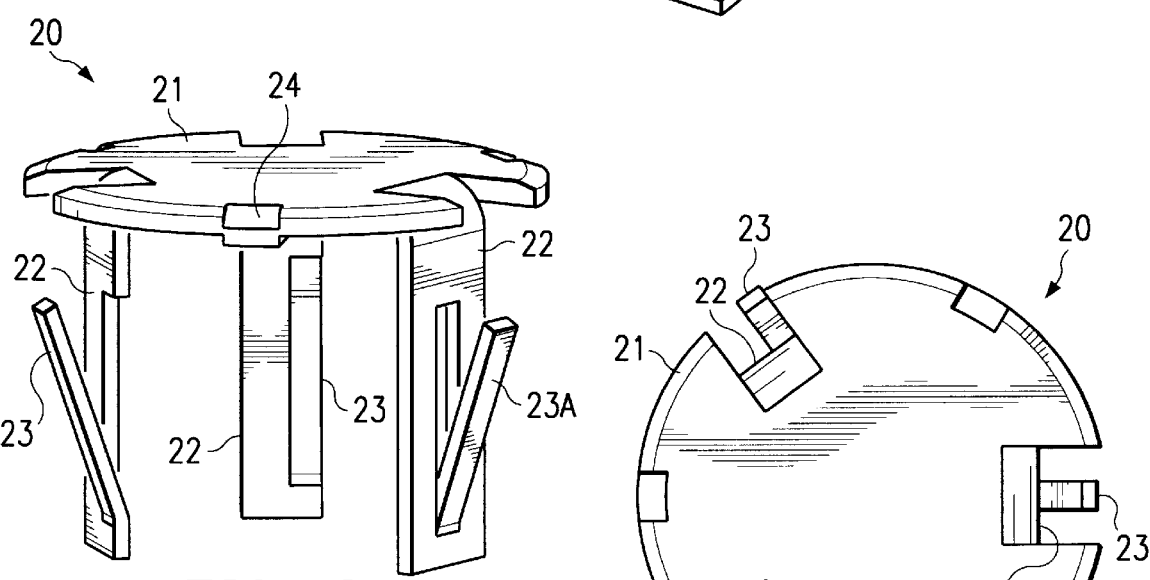
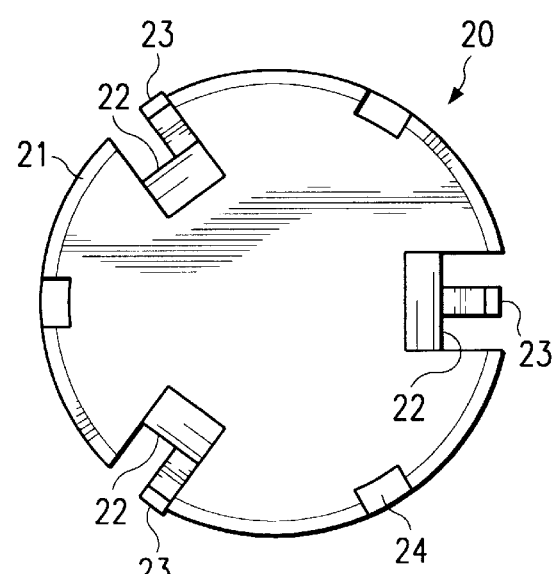

APPARATUS FOR TRAY VALVE ATTACHMENT

CROSS-REFERENCE TO RELATED APPLICATIONS

This is a non-provisional patent application based on Provisional Patent Application Ser. No. 60/061,573 filed on Oct. 10, 1997, now abandoned.

BACKGROUND OF THE INVENTION

This invention relates to an apparatus and method for attaching a fluid dispersion device to a fractionation tray. It particularly pertains to an apparatus to minimize the time and cost needed for assembling the fractionation tray with valve devices for use in distillation columns and other related apparatus in the separation between two fluids such as a vapor and a liquid.

Distillation is a process in which a fluid, typically a vapor and a liquid mixture of two or more substances is separated into its component fractions of desired purity, by the application and removal of heat. Distillation columns are designed to achieve this separation efficiently. One type of column which is used in distillation is a tray column where a number of trays of various designs hold up the liquid to provide better contact between process vapor and process liquid which leads to better separation.

Basic distillation begins from a top portion of a column to a bottom portion of the column. Heavier process liquid flows down the column while lighter process vapor ascends up the column. The main components of distillation columns include a vertical shell, where the separation of the process vapor and liquid substances occurs, and column internals, such as fractionation trays or packings. The column internals increase and enhance the separation between the process vapor and liquid. The internal configurations of the column internals such as tray spacing, column diameter, placement of assemblies to enhance flow increase the efficiency and thereby lead to a lesser requirement of energy.

In a typical distillation column arrangement, a number of horizontally oriented surfaces or fractionation trays are mounted in a sealed, vertically oriented vessel known in the industry as a column or tower. Each of the trays may contain numerous openings which enhance the separation of the vapor and liquid. The simple openings allow the lighter process vapor from below the fractionation tray surface to flow through the tray to interact with the heavier process fluid above. However, these simple openings and holes permitted the vapor to shoot or jet upward through the fractionation tray at lower fluid flow rates and flood the tray. This led to inefficient fluid exchange and separation and a reduction in efficiency and capacity of the entire distillation column.

To prevent flooding of the fractionation tray section, the openings were designed to have a partial cover or sieve above each opening. The sieve tray designed by this method prevented flooding by directing the lighter vapor into a more lateral direction. However, the sieve tray introduced a new problem of jet spray across the fractionation tray whereby the vapor would shoot in a lateral direction across the tray. This also reduced the efficiency of the tray and column. Additionally, the sieve tray was more expensive to manufacture as the sieve tray openings were machined from the same surface of the fractionation tray by punching or molding. No alterations could be readily made after construction of the sieve tray. Thus, if a portion of the sieve tray were damaged, the entire tray would need to be replaced.

Another prior art fractionation device used to enhance the vapor fluid interaction was the bubble cap. A bubble cap tray has a support riser over each opening and a cap that covers the riser. The cap is mounted so a space exists between the riser and cap to allowed the passage of the process vapor from below the tray through the bubble cap to interact with the process liquid. The vapor rises through the rise and is forced downward by the cap. Slots in the cap allow the vapor to interact or "bubble" through the liquid flowing across the tray. However, the bubble cap tray had a lower efficiency and was expensive to maintain and operate. The complicated structure also increased the costs of replacement and manufacture.

To provide an alternative to sieve and bubble caps, valve trays were developed to provide a more efficient fluid exchange and separation. The fractionation tray openings were covered with liftable cover plates. The cover plate would "float" above each tray opening. The lighter fluid from below the tray lifted the plates in a upwardly sliding motion to create a flow area for the passage of vapor. The lifting plate directed the vapor to flow horizontally through the liquid on the fractionation tray surface. The increased contact between the vapor and liquid provided better interaction and separation between the process fluids. The cover plates are typically called valves.

Various valve designs have been developed to insert the valve into the fractionation tray openings. The cover plate is attached to downward projections or legs and inserted into the tray openings. During installation, a person skilled in the art would insert the valve device into the tray opening. Another person would be required to be at or near the underside of the fractionation tray to bend or turn the legs whereby the valve would not become detached from the opening during vapor lifting and floating. Other prior art devices utilized locking mechanisms such as retainer rings to limit the lifting of the valve above the tray surface.

However, in a typical valve tray, hundreds of valves may be installed on the fractionation tray in the hundreds of openings. This is a time consuming process to have two installers insert each valve and then lock it into place by mechanical force or devices. Additionally, the cover plates of prior art valves could become stuck in a closed position to the fractionation tray surface under a vacuum pressure because of non-uniform mechanical bending and the free moving retainer rings. The non-uniform bending could also cause the valve to become stuck in an "open" position where the cover plate is locked above the fractionation tray surface. Weeping or the seepage of fluid to the tray surface below could occur leading to a greatly reduced efficiency and column.

Accordingly, there is a need for a fractionation valve which can be easily inserted into the fractionation tray openings. The fractionation valve should be easy and simple to construct while retaining enough strength to operate in the high pressure vapor and liquid environment. The fractionation valve should also move freely within the tray opening such that vapor flowing from below the tray can easily lift the valve at lower vapor pressure while preventing the valve from being suctioned closed.

SUMMARY OF THE INVENTION

This invention relates to an apparatus for use in the contact between fluids in distillation and absorption systems for mass transfer exchange between two fluids of differing masses. According to the present invention, a fractionation tray surface is provided having a plurality of valve perforations. A one-piece fractionation valve is inserted into each perforation in the fractionation tray. The valve consists of a cover plate and at least two legs. The cover plate has a larger surface area than that of the perforation opening such that the valve will cover the entire perforation. The legs extend downwardly from the cover plate into and through each perforation. Each of the legs is slidably retained in the perforation such that the one-piece cover plate can be positioned above perforation of the fractionation tray. A flexible hooking element extends outwardly from each leg away from the center of the valve. The tips of the hooking element form a larger circumference than defined by the perforation. During insertion by pressure exerted on the cover plate, each of the hooking elements will flexibly compress and bend inward toward the center of the valve to slide through the perforation. After insertion, the hooking elements expand to at or near their original circumference.

The hooking elements extend from either the center of the leg or a side portion of the leg. During expansion of the tips to the larger circumference, the hooking elements contact the underside portion of the fractionation tray to define a range of upward and downward motion of the fractionation valve within said perforation.

Preferably, the cover plate has at least one downwardly protruding tab. This prevents the fractionation valve from being vacuum suctioned to the fractionation tray surface.

The fractionation tray and valve of the present invention provides for a quick and easy insertion by a single installer. The one-piece valve construction minimizes the cost of the valves in both production and installation by reducing the number of components and labor time.

BRIEF DESCRIPTION OF THE DRAWINGS

FIG. 1 is a perspective view of a fractionation tray valve constructed according to the present invention above a fractionation tray opening.

FIG. 2 is a side elevational view showing the legs and hooking elements of the tray valve of FIG. 1.

FIG. 3 is a top view showing the cover plate, leg openings and anti-sticking tabs of the tray valve of FIG. 1.

DESCRIPTION OF THE PREFERRED EMBODIMENT

The following description of FIGS. 1 to 3 describe one preferred embodiment of the invention. The tray valve of the present invention is illustrated but is not limited to this embodiment. The descriptive language used both in the specification and claims is for the purposes of clarity and convenience and not with any purpose of implied limitation to mass transfer art, or to a vertical disposition of parts as is usually the case within a packed tower column.

The term "fluid" is adopted from the terminology of mass transfer applications, in order to describe generally, without restriction to mass transfer technology, the kind of particulates that would flow through the valve of the present invention. The particulates in mass transfer operations generally consist of droplets or bubbles at the molecular level or on a microscopic scale. Typically, "vapor" or "gas" is a lighter fluid and "liquid" is a heavier fluid. The tray valve of the present invention is ideally utilized in a high fluid pressure environment, such as in a trayed distillation tower column. This high fluid pressure environment allows for the separation of vapors and liquids.

The terms "tray" and "tray deck" refer to the surface within a tower column used in mass transfer applications. The tray is also described as a fluid contacting fractionation tray. In a typical tray installation, the upper surface of the tray is toward the top of the tower and the lower surface of the tray is toward the bottom of the tower. Several tray openings are positioned throughout the tray deck surface. Ordinarily, valves or other devices are positioned on or near the openings to regulate the flow of vapors through the liquids. However, the term tray herein means simply any surface through which a valve, such as in the present invention, is attached to.

The tray valve of the present invention may be constructed to fit within the mass transfer fractionation trays. The tray valve is illustrated, described and claimed, generically and in preferred specific embodiments.

The tray valve of the present invention is preferably inserted into the openings of the trays for use in a tower column and fluid environment. However, it is not intended to restrict the application of the invention to a valve for use in only a fluid environment or a tower column.

Throughout the specification and claims, reference is made to "movable" as generally describing the movement of the tray valve when inserted into the tray deck and opening. In general, the tray valve preferably moves in an upward and downward motion relative to the tray deck. This movement allows for the fluid to pass from one side of the tray deck to the other side to accomplish the fractionation of fluids required by mass transfer technology.

Referring to the drawings in detail, wherein like numerals indicate like elements, a tray deck 1 incorporating a tray valve unit 20 according to the present invention is shown in FIG. 1. Tray 1 includes an opening 10 for the passage of fluid from one side of the tray to the other side of the tray deck. Generally, the tray valve 20 has a larger diameter than the diameter of the opening 10, so the tray valve does not freely pass though the opening.

More specifically, a circular cover plate 21 of tray valve 20 is larger in diameter than opening 10. The cover plate 21 is a generally flat surface of conventional construction. Extending from the cover plate 21 is at least two integral valve legs 22. Preferably, the tray valve 20 of the present invention has three valve legs to maintain the valve within opening 10. The valve legs 22 extend through the opening 10 leaving cover plate 21 above the surface of tray 1. This prevents the valve unit from moving laterally or falling out of the tray opening 10. The valve legs 22 generally extend from the cover plate 21 downward at specific points about 90 degrees from the bottom surface of the cover plate. The circumference of the ring formed by the legs is generally the same diameter as the tray opening 10. This allows for a snug fit when the tray valve 20 is inserted into the opening 10.

Typically, the tray opening 10 has at least one antirotation tab 1A. This tab 1A protrudes slightly from the edge of the diameter of the tray opening 10. When tray valve 20 and legs 22 are inserted into the opening, the tab 1A restricts the rotation of the valve unit 20 within the opening. This allows for the uniform passage of fluid through the tray and openings as the movement of the tray valve remains fairly consistent so as to provide a predictable fluid flow for fluid rate calculations and higher efficiency.

Referring to FIG. 2, the tray valve 20 with the three extending legs 22 generally directed downward about 90 degrees from the cover plate 21. The tray valve is preferably constructed of any metal but may be made of any other suitable material which can be used in mass transfer applications within a trayed tower distillation column. The integral legs 22 extend downward at 90 degrees from the cover plate 21 from the cover plate and at the 120 degree positions when viewed from above (see FIG. 3).

A portion of the leg protrudes in an outwardly direction. This outward projection is hooking element 23. Preferably, as shown in FIG. 2, each leg has a hooking element. However, in an alternative embodiment, only one leg may incorporate a hooking element and the remaining leg(s) are of conventional design. A more detailed description of such a leg design can be found in U.S. Pat. Nos. 3,815,880 and 4,344,900, the complete disclosures of which are also incorporated herein by reference. The projection of hooking element 23 forms an acute angle of less than 45 degrees between the leg and the hooking element 23. Preferably, the hooking element 23 extends or projects from near the distal tip of the leg or more towards the middle or proximal portion of leg 22. Similarly, hooking element 23 is also only a portion of the leg, either a side portion of element 23 or a middle portion as in hooking element 23A and not the entire leg.

It will be recognized by one skilled in the art that hooking elements 23 and 23A project outward at a distal tip end from the smaller diameter formed from by the legs 22 and toward the larger diameter formed by the cover plate 21 at a proximal portion near the top of the valve unit. This design allows for the entire valve unit to be quickly snapped into a tray opening with minimal or moderate pressure using an installer's hand. The proximal ends of the hooking elements 23/23A form a circle with a diameter greater than the opening 10 of the tray deck 1. This allows for the valve unit 20 to be retained movably when inserted into the tray deck but secured within the opening. The circle formed by the proximal ends of hooking elements 23/23A slightly overlaps the opening of the fluid contact tray to also act as a "catch" preventing the tray valve unit 20 from becoming dislodged or coming out of tray 1 and opening 10. The distance between the proximal end of the hooking element 23 and the cover plate 21 limits the amount of upward and downward travel of the valve unit 20 to a predetermined maximum limit above the tray deck when installed in a tray deck and during use. This "floating" movement allows for the fractionation of fluids to occur during mass transfer operation. Because the direction and positioning of the hooking element inherently allows for easy installation and snap-in of the valve unit, a single person can install valve units with less force and more efficiency. The direction of the hooking elements also assist field personnel in replacing damaged valves more quickly. This reduces costs in both manpower and material used in the installation of valve units within fractionation trays.

As shown in FIG. 3, the integral legs 22 extend downward 90 degrees from the cover plate and at approximately 120 degree positions relative to the other legs as seen from above. Alternatively, if the tray valve incorporates only two legs, the legs will be positioned approximately 180 degrees from each other on cover plate 21 as viewed from above. The leg notches 25 formed from where the legs extend in a downward direction allow for an open area between the tray and cover plate 21. As seen from above, hooking elements 23 and 23A only protrude as a portion of the leg 22. Thus, the hooking element does not completely block the opening 10 in the tray and notch 25 in the tray valve allowing for the free flow of lighter and heavier fluid and a more efficient fractionation operation.

Additionally, anti-sticking tabs 24 protrude from cover plate 21 as shown by FIGS. 2 and 3. Tabs 24 project slightly downwardly from the plane formed by the cover plate 21. This prevents the flat, planar surface of the cover plate from becoming completely suctioned to the tray deck during the fractionation process. This allows for the tray valve 20 to remain movable when installed in the tray deck, thus, not blocking the flow of fluid between the trays.

While the invention has been described with respect to its preferred embodiments, other alternative constructions can be used. For example, the size and shape of the hooking element on each leg may be adjusted depending on the design of the tray that the valve will be inserted into. The legs and the respective hooking elements may also be adapted to a square or any other shape of a valve cover plate or cap such as square, rectangular, triangular or other shape with the same effect. Also, the valve unit may be used in other tray designs other than a fluid environment where an adjustable and movable but securely fastened valve in a tray is required.

Other modifications include incorporating the fractionation tray into conventional perforations of the fractionation tray deck. During fabrication of the tray valve, the legs and hooking elements may be adapted such that the valve may rotate within the fractionation tray opening. In this configuration, the one-piece valve may be adapted to be inserted as a replacement in traditional fractionation tray perforations.

These and various other modifications can be made to the disclosed or other embodiments without departing from the subject of the invention.

What is claimed is:

1. A fractionation tray surface having a plurality of perforations, and a one-piece fractionation valve constructed to be inserted into one of said perforations in the fractionation tray, said valve comprising:

a cover plate, said cover plate being of larger surface area than said perforation and having a center, said cover plate having at least one anti-sticking tab, the at least one anti-sticking tab having an axis of bending substantially normal to a line between the center of the cover plate and the axis of bending;

at least two legs extending downward from said cover plate, each of said legs being slidably retained in said perforation such that the cover plate is variably positioned above said perforation of the fractionation tray, each of said legs having a flexible hooking element extending outside the periphery of the perforation, wherein each of said hooking elements is deformed to flexibly compress during insertion into the perforation and expand to extend outside the periphery of the perforation after insertion such that each of said hooking elements contacts an underside portion of the fractionation tray thereby defining a range of upward and downward motion of the fractionation valve within said perforation.

2. The apparatus according to claim 1, wherein the at least one anti-sticking tab is located at a different peripheral position than the at least two legs.

3. The apparatus according to claim 1, wherein at least one of the hooking elements protrudes from a center portion of the leg.

4. The apparatus according to claim 1, wherein the hooking element protrudes from a side portion of the leg.

5. The apparatus according to claim 1, wherein said plurality of perforations is distributed uniformly across the fractionation tray surface.

6. The apparatus according to claim 1, wherein said valve comprises at least three legs.

7. The apparatus according to claim 1, wherein at least one of said perforations is substantially circular.

8. A fractionation apparatus comprising:
a tray having a perforation, the perforation having a periphery;
at least one anti-rotation tab protruding into the perforation from the periphery; and
a valve slidably connectable to the tray, the valve comprising:
  a cover plate having at least one anti-sticking tab;
  at least two legs extending from the cover plate;
  at least one hooking element extending outwardly from at least one of the legs; and
  wherein the at least one hooking element is deformable for insertion into the perforation and resilient to extend outside the periphery of the perforation after insertion into the perforation.

9. The fractionation apparatus of claim 8, wherein the cover plate has a center and the at least one anti-sticking tab has an axis of bending substantially normal to a line between the center of the cover plate and the axis of bending.

10. The fractionation apparatus of claim 8, wherein the at least one anti-sticking tab is located at a different peripheral position than each of the at least two legs.

11. The fractionation apparatus of claim 8, wherein the at least one hooking element protrudes from a center portion of the leg from which the hooking element extends.

12. The fractionation apparatus of claim 8, wherein the at least one hooking element protrudes from a side portion of the leg from which the hooking element extends.

13. The fractionation apparatus of claim 8, wherein the tray has a plurality of perforations.

14. The fractionation apparatus of claim 13, wherein the plurality of perforations are distributed uniformly across the tray.

15. The fractionation apparatus of claim 8, wherein the valve comprises at least three legs extending from the cover plate.

16. The fractionation apparatus of claim 8, wherein the perforation is substantially circular.

17. The fractionation apparatus of claim 8, wherein the valve is a one-piece valve.

18. A fractionation apparatus comprising:
a tray having at least one perforation, the perforation having a periphery;
at least one anti-rotation tab protruding into the perforation from the periphery; and
at least one valve slidably connectable to the tray, the valve comprising:
  a cover plate having a center and having at least one anti-sticking tab, the anti-sticking tab having an axis of bending substantially normal to a line between the center of the cover plate and the axis of bending;
  at least two legs extending from the cover plate, the legs being located at a different peripheral position than the anti-sticking tab;
  at least one hooking element extending outwardly from at least one of the legs; and
  wherein the at least one hooking element is deformable for insertion into the perforation and resilient to extend outside the periphery of the perforation after insertion into the perforation.

19. The fractionation apparatus of claim 18, wherein an angle formed by the leg and the hooking element is no greater than 45 degrees.

20. The fractionation apparatus of claim 18, wherein the valve is a one-piece valve.

* * * * *